United States Patent
Miller

(10) Patent No.: US 12,048,601 B2
(45) Date of Patent: Jul. 30, 2024

(54) METHOD OF MANUFACTURING A DENTAL COMPONENT

(71) Applicant: DEKEMA DENTAL-KERAMIKÖFEN GMBH, Freilassing (DE)

(72) Inventor: Stephan Miller, Traunstein (DE)

(73) Assignee: DEKEMA Dental-Keramiköfen GmbH, Freilassing (DE)

( * ) Notice: Subject to any disclaimer, the term of this patent is extended or adjusted under 35 U.S.C. 154(b) by 650 days.

(21) Appl. No.: 17/265,503

(22) PCT Filed: Aug. 5, 2019

(86) PCT No.: PCT/EP2019/071048
§ 371 (c)(1),
(2) Date: Feb. 2, 2021

(87) PCT Pub. No.: WO2020/030605
PCT Pub. Date: Feb. 13, 2020

(65) Prior Publication Data
US 2021/0196427 A1 Jul. 1, 2021

(30) Foreign Application Priority Data
Aug. 6, 2018 (DE) .......................... 102018119078.6

(51) Int. Cl.
*A61C 13/08* (2006.01)
*A61C 5/77* (2017.01)
(Continued)

(52) U.S. Cl.
CPC .............. *A61C 13/081* (2013.01); *A61C 5/77* (2017.02); *A61C 13/0004* (2013.01);
(Continued)

(58) Field of Classification Search
CPC ................................ B29C 64/00; B33Y 10/00
See application file for complete search history.

(56) References Cited

U.S. PATENT DOCUMENTS

| 6,739,959 B2 * | 5/2004 | Bodenmiller | ........ A61C 13/083 |
| | | | 451/364 |
| 7,092,780 B2 * | 8/2006 | Ganley | ................ A61C 13/081 |
| | | | 700/98 |

(Continued)

FOREIGN PATENT DOCUMENTS

| DE | 10037681 B4 | 8/2007 |
| DE | 102010064142 A1 | 6/2012 |

(Continued)

OTHER PUBLICATIONS

German Patent Office Search Report mailed Feb. 21, 2019 for German Patent No. 102018119078.6, 2 pages.

(Continued)

*Primary Examiner* — Atul P. Khare
(74) *Attorney, Agent, or Firm* — Dickinson Wright PLLC

(57) ABSTRACT

The present invention relates to a method of manufacturing a dental component, in particular a dental prosthesis or a partial dental prosthesis, by means of a dental furnace, comprising the following steps:
  (i) producing a model of the dental component;
  (ii) embedding the model in an investment material;
  (iii) removing the model from the investment material, in particular by heating or burning out, to obtain a negative mold of the model;
  (iv) inserting a raw material required for manufacturing the dental component into the negative mold;
  (v) producing the dental component in the negative mold; and (Continued)

Figure 1:
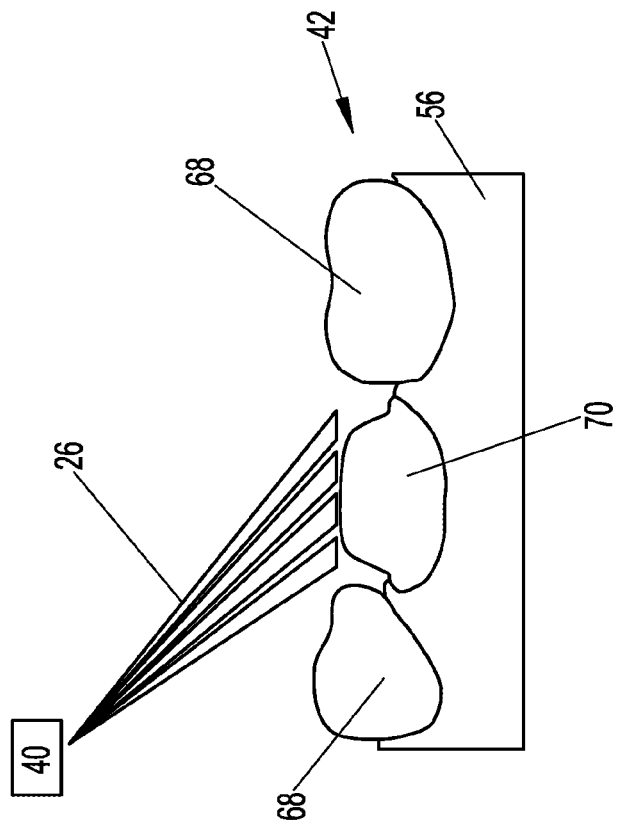

(vi) deflasking the dental component in an at least partly automated manner, in particular by means of a stripping manufacturing process, on the basis of a virtual model of the dental component.

19 Claims, 11 Drawing Sheets

(51) Int. Cl.
*A61C 13/00* (2006.01)
*A61C 13/34* (2006.01)
*B29C 33/38* (2006.01)
*B29C 33/44* (2006.01)
*B29C 33/48* (2006.01)
*B29C 64/386* (2017.01)
*B33Y 10/00* (2015.01)
*B33Y 50/00* (2015.01)
*A61C 5/70* (2017.01)

(52) U.S. Cl.
CPC .......... *A61C 13/34* (2013.01); *B29C 33/3835* (2013.01); *B29C 33/3892* (2013.01); *B29C 33/448* (2013.01); *B29C 33/48* (2013.01); *B29C 64/386* (2017.08); *B33Y 10/00* (2014.12); *B33Y 50/00* (2014.12)

(56) References Cited

U.S. PATENT DOCUMENTS

| | | | | |
|---|---|---|---|---|
| 7,845,924 B2* | 12/2010 | Cadario | ............... | A61C 13/082 |
| | | | | 425/572 |
| 8,352,060 B2* | 1/2013 | Chun | ................ | A61C 13/0004 |
| | | | | 700/98 |
| 8,636,512 B2* | 1/2014 | Dierkes | .................. | B33Y 70/00 |
| | | | | 433/201.1 |
| 9,603,683 B2* | 3/2017 | Dierkes | ..................... | A61C 5/77 |
| 2002/0125619 A1 | 9/2002 | Bodenmiller et al. | | |
| 2003/0198912 A1* | 10/2003 | Mah | ......................... | A61C 7/08 |
| | | | | 433/5 |
| 2006/0261503 A1* | 11/2006 | Sago | .................... | A61C 13/081 |
| | | | | 264/16 |
| 2009/0026643 A1* | 1/2009 | Wiest | ...................... | A61C 5/77 |
| | | | | 264/16 |
| 2014/0377718 A1 | 12/2014 | Korten et al. | | |
| 2016/0184062 A1* | 6/2016 | Jussel | ..................... | A61C 5/77 |
| | | | | 264/16 |
| 2018/0171052 A1* | 6/2018 | Bonderer | ............... | C08L 35/02 |
| 2021/0317297 A1* | 10/2021 | Jena | ....................... | A61C 13/34 |

FOREIGN PATENT DOCUMENTS

| | | | | |
|---|---|---|---|---|
| DE | 102016225208 A1 | | 6/2018 | |
| EP | 2082703 A2 | | 7/2009 | |
| JP | 05192352 A | * | 8/1993 | ......... A61C 13/0007 |
| JP | 2011167726 A | * | 9/2011 | |
| WO | 02/09612 A1 | | 2/2002 | |
| WO | WO-2008103024 A1 | * | 8/2008 | ......... A61C 13/0004 |

OTHER PUBLICATIONS

International Search Report and Written Opinion, with English translation, mailed Oct. 28, 2019 for International Application No. PCT/EP2019/071048, 19 pages.

* cited by examiner

METHOD OF MANUFACTURING A DENTAL COMPONENT

CROSS-REFERENCES TO RELATED APPLICATIONS

This application is a 371 National Phase Application of Patent Application PCT/EP2019/071048, filed on Aug. 5, 2019, which claims the priority of German Application No. 102018119078.6 filed on Aug. 6, 2018, each of which is incorporated herein by reference, in its entirety.

The present invention relates to a method of manufacturing at least one dental component, in particular a dental prosthesis or a partial dental prosthesis.

Methods of manufacturing dental components are generally known and usually comprise a plurality of complex individual steps that are performed manually for the most part. In a first step, a dental impression of the respective patient is prepared. The model for the dental component to be produced can subsequently be produced with the aid of this dental impression. For this purpose, the model is, for example, molded by hand using a—still unprocessed—wax blank. The wax blank can be characterized by a size adapted to the dental impression, wherein the wax blank is also processed in a complex manner and is individually adapted to the dentition of the patient. However, it is also possible to select an already molded wax blank—at least approximately suitable for the conditions present with the impression—that only has to be modified slightly or not at all. The finished model of the dental component is subsequently positioned by hand on a base body, a so-called column, to produce a so-called abutment. The column is composed of a material that has similar properties to the material of the model at least with respect to the melting behavior. The model is embedded together with the column in an investment material. As soon as the investment material has been cured, the model and the column are burnt out of the investment material. For this purpose, the cured investment material is positioned in a furnace such that the melted model material can flow out of the investment material. The result of the process is a negative mold of the model and of the column—that is of the abutment—in the investment material.

The negative mold is subsequently filled with a raw material of which the dental component is to be composed. The raw material is present in pellet form, for example. It is inserted into the channel of the negative mold formed by the column. The raw material is melted within the negative mold by a suitable process and using a corresponding apparatus and is—at least temporarily—acted on by a pressing force. After the curing of the component, the negative mold subsequently has to be removed carefully and usually in a very complex manner to expose the finished dental component in an undamaged manner.

The production of the dental component is thus associated with a very high work effort. In addition, due to the large number of required individual steps for producing the dental component, defects can occur at many points and defects can be carried away.

It is therefore an object of the present invention to provide a method of manufacturing a dental component and a corresponding system that is characterized by a lower work effort. In addition, the possible error sources should be minimized.

This object is satisfied by a method having the features of claim 1 and by a system having the features of claim 13.

The method comprises the following steps:
(i) producing a model of the dental component;
(ii) embedding the model in an investment material;
(iii) removing the model from the investment material, in particular by heating or burning out, to obtain a negative mold of the model;
(iv) inserting a raw material required for manufacturing the dental component into the negative mold;
(v) producing the dental component in the negative mold; and
(vi) deflasking the dental component in an at least partly automated manner, in particular by means of a stripping manufacturing process, on the basis of a virtual model of the dental component.

Therefore, the method in accordance with the invention is characterized in that a virtual model of the dental component is prepared and the dental component is deflasked in an at least partly automated manner on the basis of this virtual model. Partly automated in this respect means that a combination with a manual deflasking process can also be considered.

For the manufacture of a dental component, a model is—as already mentioned—required on the basis of which a negative mold of the desired dental component is prepared. For example, the model is produced from a wax-like blank.

Depending on the production type, the virtual model of the dental component can be prepared before, during, or after the production of the model. If the virtual model is prepared after the production of the model, the model produced can thus in particular be scanned to obtain a virtual model.

The model produced is embedded in an investment material. Some already known methods can be selected for the embedding.

To obtain a negative mold of the model, the model is removed from the investment material. The model and the base body are preferably melted or burned out by an elevated temperature.

The raw material is subsequently inserted into the negative mold to produce the dental component.

The dental component is produced in the negative mold. Following the curing of the raw material after the firing process, the dental component produced is present in the negative mold.

In accordance with the invention, the data of the virtual model are subsequently used to determine the position of the dental component in the negative mold and to deflask the dental component on the basis of the determined position. The volume and/or the geometry of the dental component and/or other characteristic parameters of the dental component can additionally be taken into account by the virtual model in the deflasking process in order not to damage the dental component during the deflasking. The type and/or the properties of the investment material can also be taken into account in this respect.

To accelerate the deflasking, a total segment (or a plurality of segments) of the investment material can be cut off when it is known based on the virtual model that the dental component is not present in the segment.

It is likewise conceivable that a portion of the investment material is manually removed. In this respect, it is particularly preferred if a portion of the investment material is removed that is the furthest away from the dental component produced. After the manual removal of a portion of the investment material, the remaining investment material is removed in an automated manner. It is self-explanatory that the manual removal and the automated removal can also be swapped so that the portion of the investment material removed from the dental component produced is first removed in an automated manner and the dental component is then manually deflasked.

The exposed dental component can already be ready for use or can be processed further.

Advantageous embodiments of the invention are also set forth in the claims, in the following description, and in the Figures.

Provision can be made that the virtual model is based on a 3D scan of the model and/or on a tomography of the negative mold; and/or that the virtual model is based on a digital model of the dental component that was produced with the aid of virtual data of a dentition of a patient or of a part thereof.

Provision can furthermore be made that the virtual data of a dentition of a patient or of a part thereof are generated on the basis of an interoral scan and/or of a scan of a negative impression of a dentition of a patient or of a part thereof. The virtual data can also be produced by scanning a physical model produced on the basis of the negative impression.

In accordance with an embodiment, a deflasking device for deflasking the dental component is provided and comprises a control unit that controls the deflasking device on the basis of the virtual model.

The deflasking of the dental component can be controlled by the control unit. Since the deflasking takes place at least partly automatically, it can, for example, additionally be output to an operator of the deflasking device via the control unit when the automated part is finished and when a manual intervention is required. A partly manual deflasking can also be controlled and/or monitored by the control unit.

In accordance with a further embodiment, a desired/actual comparison by means of the virtual model and data of a tomography of the negative mold (with the component therein) is performed and the automated deflasking is adapted on the basis of the desired/actual comparison.

Due to the desired/actual comparison, the dental component can be prevented from being damaged during the automated deflasking. For example, the distance of the dental component from a removal position of the deflasking process can be monitored. Subsequently, the removal speed of the deflasking process can, for example, be adjusted on the basis of the determined desired/actual comparison.

Due to the monitoring by means of tomography or measurement or scanning, errors such as an incorrect positioning in the investment material can additionally be detected at an early time and the deflasking process can be coordinated therewith.

Provision can be made that the stripping manufacturing process comprises a compressed air blasting using a blasting means, and/or a water blasting, and/or a milling.

In accordance with a further embodiment, a removal rate or a speed of the deflasking is adjustable, in particular automatically in dependence on progress of the deflasking.

The automated deflasking can in particular be designed such that the removal rate or the removal speed is adapted to the position of the produced dental component within the investment material.

Provision can furthermore be made that the negative mold is removed at a lower removal rate or a lower speed in the vicinity of the dental component than at a greater distance from the dental component.

A gentle and nevertheless efficient deflasking of the dental component is hereby made possible.

The negative mold preferably has at least one means for—virtually—defining a model coordinate system relative to a coordinate system of the deflasking device, by which means the position and/or alignment of the dental component in the negative mold can be determined with respect to the deflasking device; and/or in that the negative mold and/or the deflasking device has/have at least one alignment means, in particular at least one optical marking and/or one mechanical coding, by which alignment means an exact alignment of the negative mold in the deflasking device can be defined. Equally, the model can be fixed in a well-defined shape during the embedding so that its position and alignment in the body formed by the embedding are known.

Due to the possibility of a precise alignment of the negative mold, it can be moved without problem after the individual steps of the method without this being able to be a trigger for a faulty deflasking. The method is thereby not only simplified, the handling of the negative mold is additionally much more flexible, whereby the method can be accelerated without this having negative consequences on the deflasking quality.

In accordance with a further embodiment, the model of the dental component is manufactured by means of additive manufacturing, in particular by means of 3D printing.

The process can be further automated by additive manufacturing. A human error in the processing of the model is hereby reduced. In addition, fine details in the structure of the dental component can be produced in a reproducible manner with the aid of additive manufacturing, which is only possible to a limited extent in a production of the model by hand.

In addition, considerable costs can be saved by producing the model by means of additive manufacturing, or 3D printing, since, on the one hand, no storage or holding costs for model blanks are incurred and, on the other hand, material costs can be saved since additive manufacturing—as the name already suggests—is a build-up process and excess material therefore does not have to be removed and disposed of by means of a stripping process, as is the case with a reworking of a model blank.

The model of the dental component is preferably produced on the basis of the virtual model.

A system in accordance with the invention for manufacturing a dental component, in particular a dental prosthesis or a partial dental prosthesis, comprises a deflasking device for an at least partly automated removal of the dental component from a negative mold on the basis of a virtual model; and a control device, with the deflasking device being connectable or connected to the control device to receive control data from the control device, in particular with the deflasking device working by means of a stripping manufacturing process such as compressed air blasting, and/or water blasting, and/or milling.

If compressed air blasting is, for example, used for removing the investment material, the deflasking device can comprise at least one nozzle by which a blasting means used is applied to the negative mold or to the investment material to be removed. The blasting means is accelerated with the aid of the nozzle such that it can remove the investment material on impact. The stripping manufacturing process is at least partly automated; the deflasking device can, for example, execute a deflasking program with the aid of the control unit.

The deflasking device can also comprise a separating process by means of which the dental component is deflasked. A combination of stripping and separating manufacturing processes can also be provided, whereby the negative mold is detached in a first step, for example, segment by segment. The remainder of the negative mold, which comprises the dental component, is subsequently removed using the stripping manufacturing process and the dental component is carefully deflasked.

In accordance with a possible embodiment of the system, the system additionally comprises a programmable dental furnace, with the programmable dental furnace being connectable or connected to the control device, in particular with the control device being configured and adapted to automatically select a program for operating the dental furnace and/or to automatically prepare such a program and/or to automatically suggest such a program on the basis of the virtual model of the dental component, in particular with the control device being configured and adapted to directly or indirectly control the dental furnace.

A program that controls and/or regulates the operation of the furnace is prepared or selected automatically—i.e. without an intervention by an operator—on the basis of the virtual model. The program can be used directly or it is suggested to the operator who must authorize the use of the program. It is also conceivable that the program suggested can be modified by the operator before it is started.

Since the virtual model is known, the volume and/or the geometry of the dental component and/or other characteristic parameters of the dental component can be taken into account when selecting or preparing the program controlling/regulating the furnace to ensure ideal firing results and also to take economic aspects into account at the same time. The data of the virtual model are used to select a suitable program from a program library stored in the furnace or from a program library stored in an external database. It is likewise possible that a program taken from a library is adapted or modified while taking into account the virtual model or that an individual program is created on the basis of the virtual model. The type and/or the properties of the raw material that is used to produce the component can be taken into account when selecting/generating the program. The corresponding information is in particular integrated into the virtual model.

The dental furnace preferably has a pressing device by means of which the raw material can be inserted into the negative mold on the application of a pressing force and/or by means of which the dental component can be produced on the application of a pressing force. In principle, the total firing process or at least parts thereof can take place on the application of a pressing force.

In accordance with a possible embodiment of the system, the system additionally comprises a raw data acquisition device, in particular an optical scanner, for intraorally scanning a dentition of a patient or a part thereof and/or for scanning a negative impression of a dentition of a patient or a part thereof and/or for scanning a model of the dental component.

In accordance with a further embodiment of the system, the control device is configured and adapted to receive the virtual model and/or to prepare the virtual model on the basis of data of at least one scan.

The system preferably additionally comprises a model manufacturing apparatus for the additive manufacturing of the model on the basis of the virtual model, in particular with the model manufacturing apparatus being connectable or connected to the control device to receive control data from the control device. Alternatively, the control data can also be generated in the model manufacturing apparatus on the basis of the data of the virtual model.

In accordance with a further embodiment of the system, the system additionally comprises a programmable furnace for removing the model from the investment material, with the furnace being connectable or connected to the control device to receive control data from the control device, in particular with the control device being configured and adapted to automatically select at least one process parameter for operating the furnace and/or to automatically prepare such a process parameter and/or to automatically suggest such a process parameter on the basis of a virtual model of the dental component.

In accordance with yet a further embodiment, the scanning apparatus and/or the model manufacturing apparatus and/or the programmable furnace and/or the dental furnace and/or the deflasking device has/have a control unit that is separate from the control device and that is connectable and/or connected to the control device, in particular with the control device providing a higher-ranking control.

Figure 2:
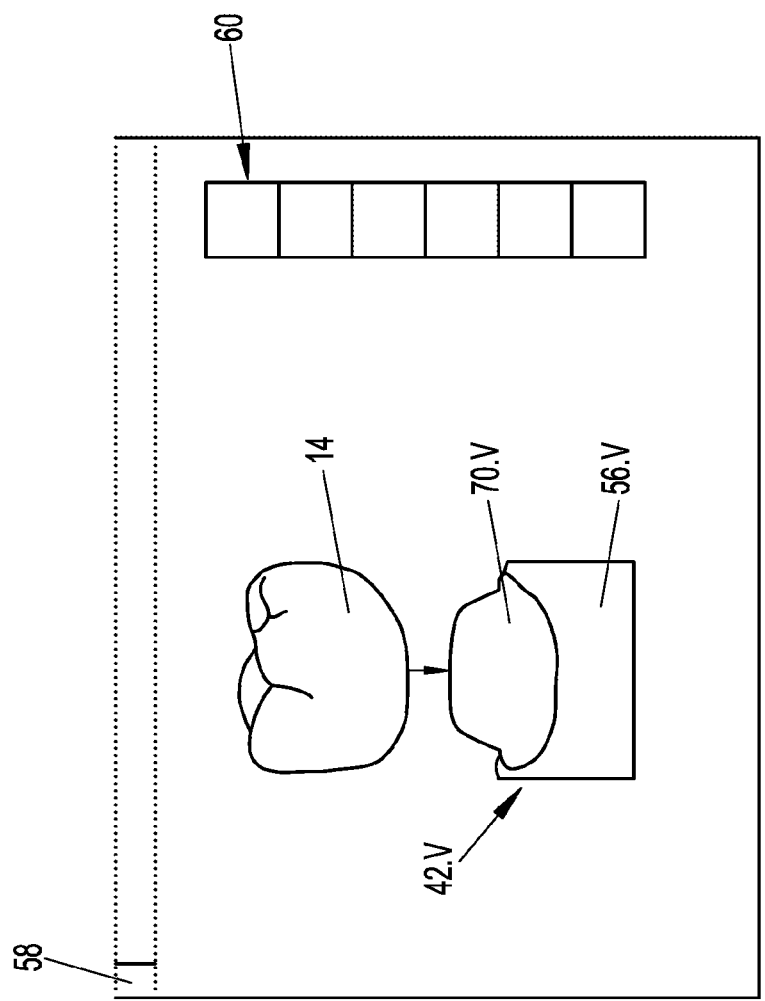
Figure 3:
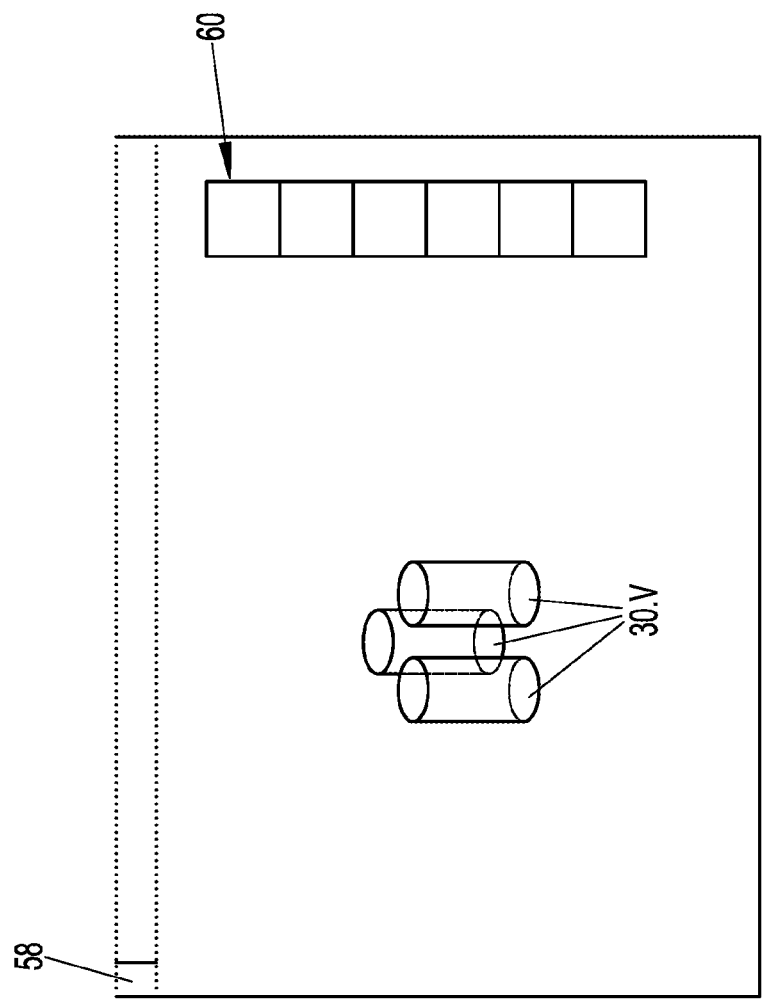
Figure 4:
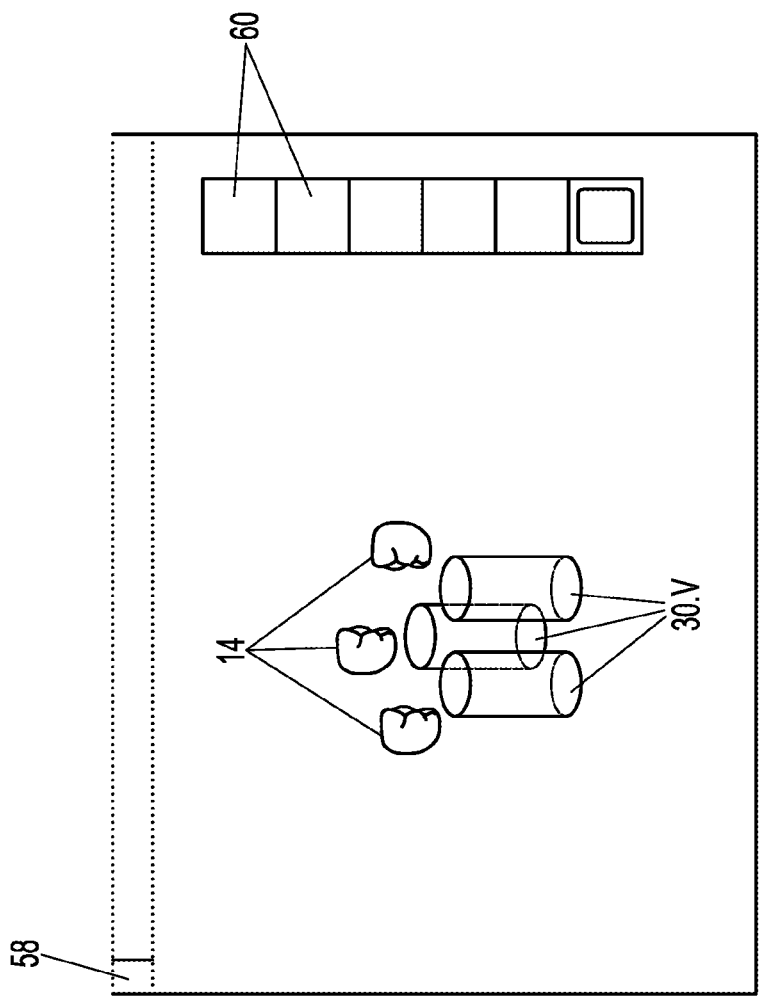
Figure 5:
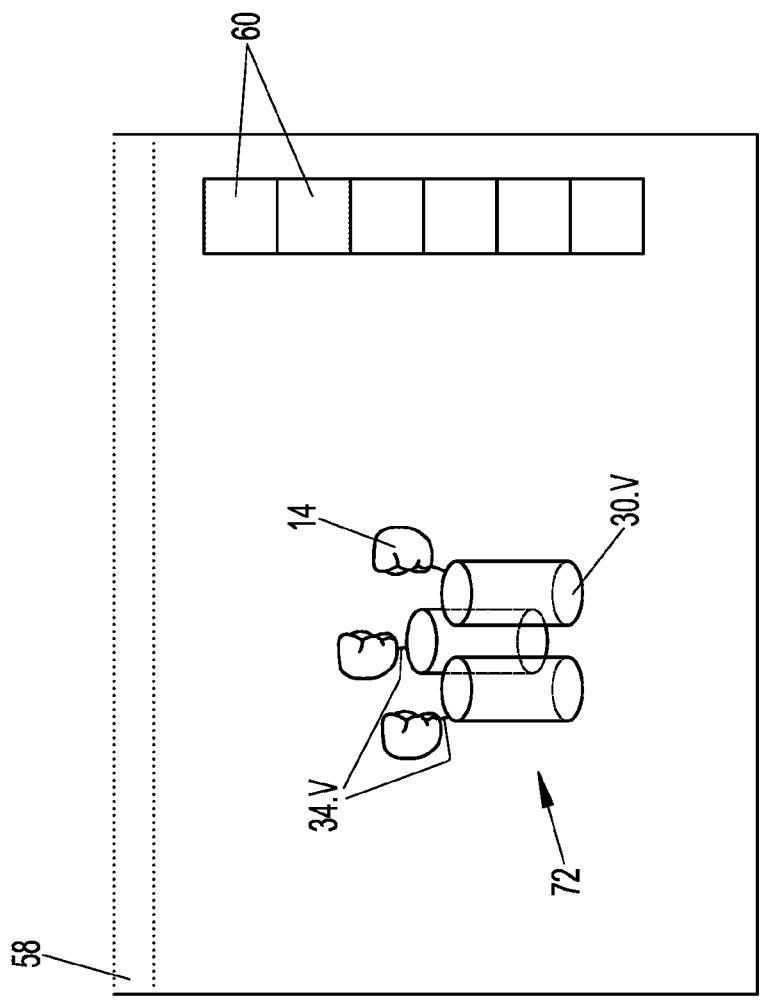
Figure 6:
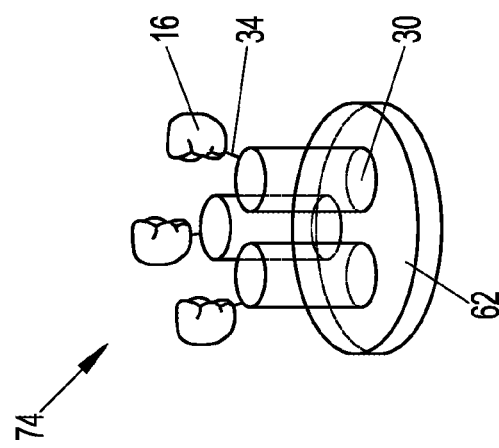
Figure 7:
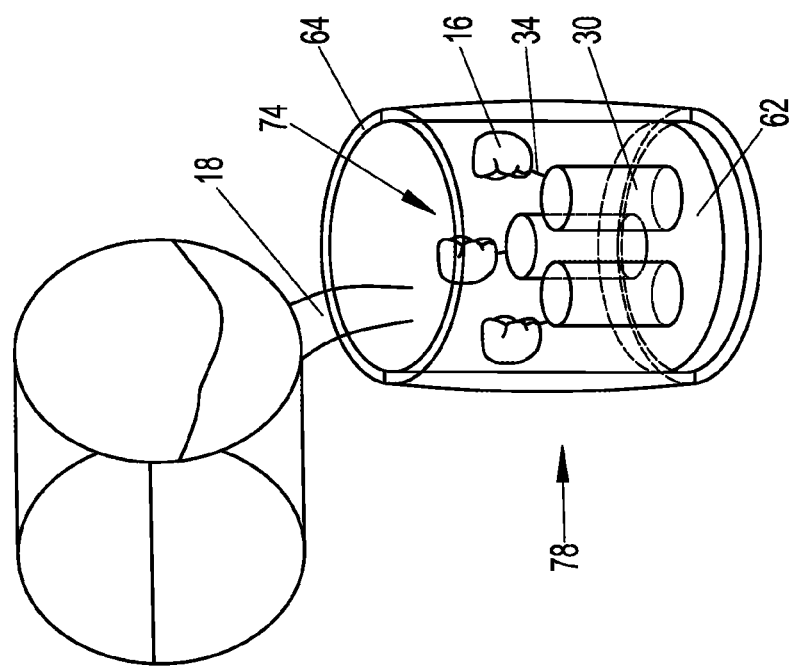
Figure 8:
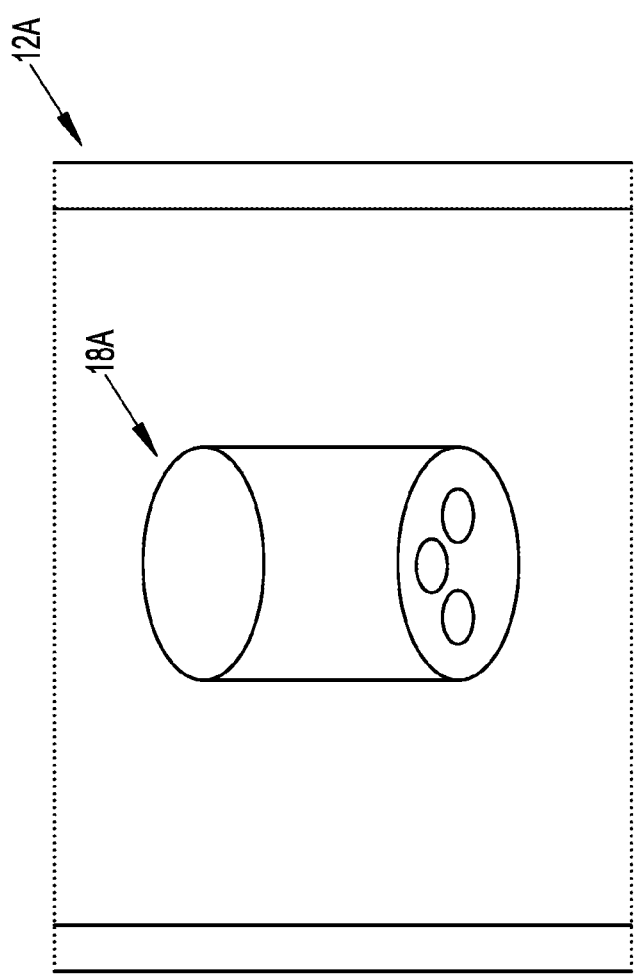
Figure 9:
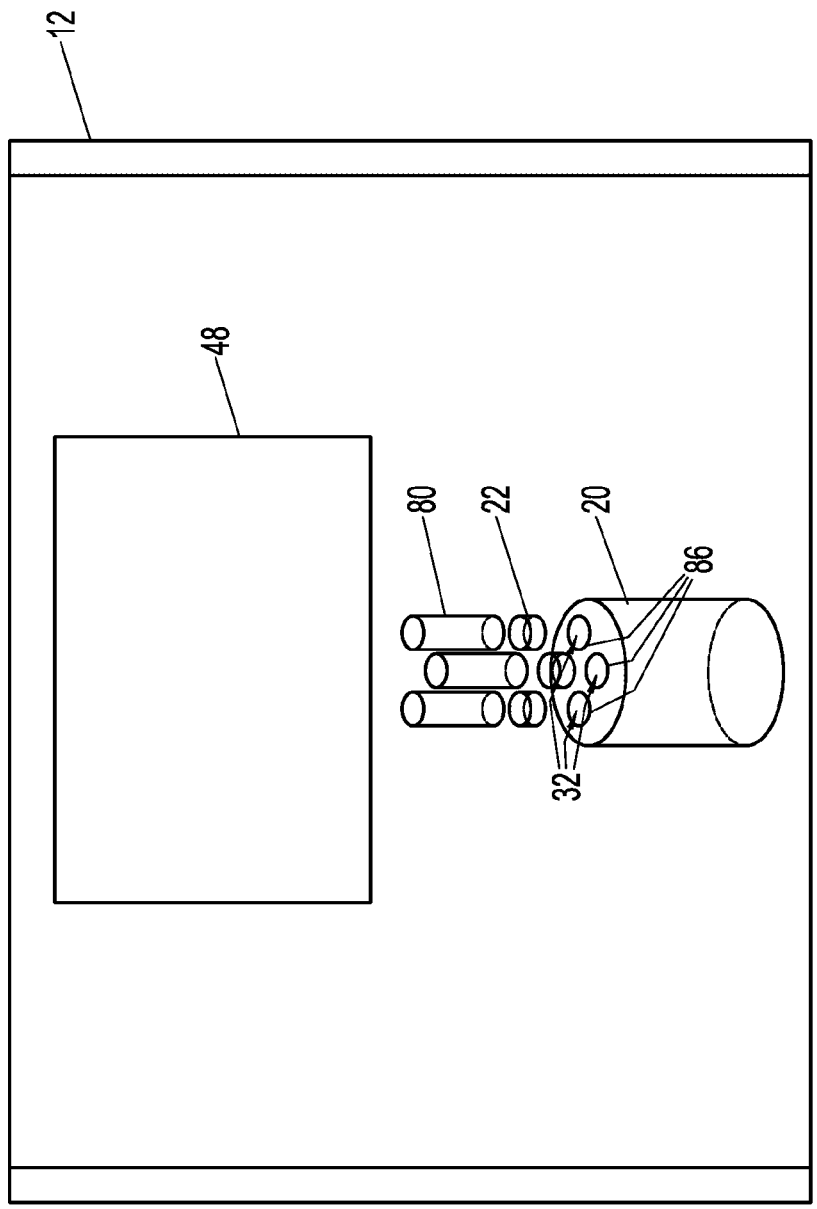
Figure 10:
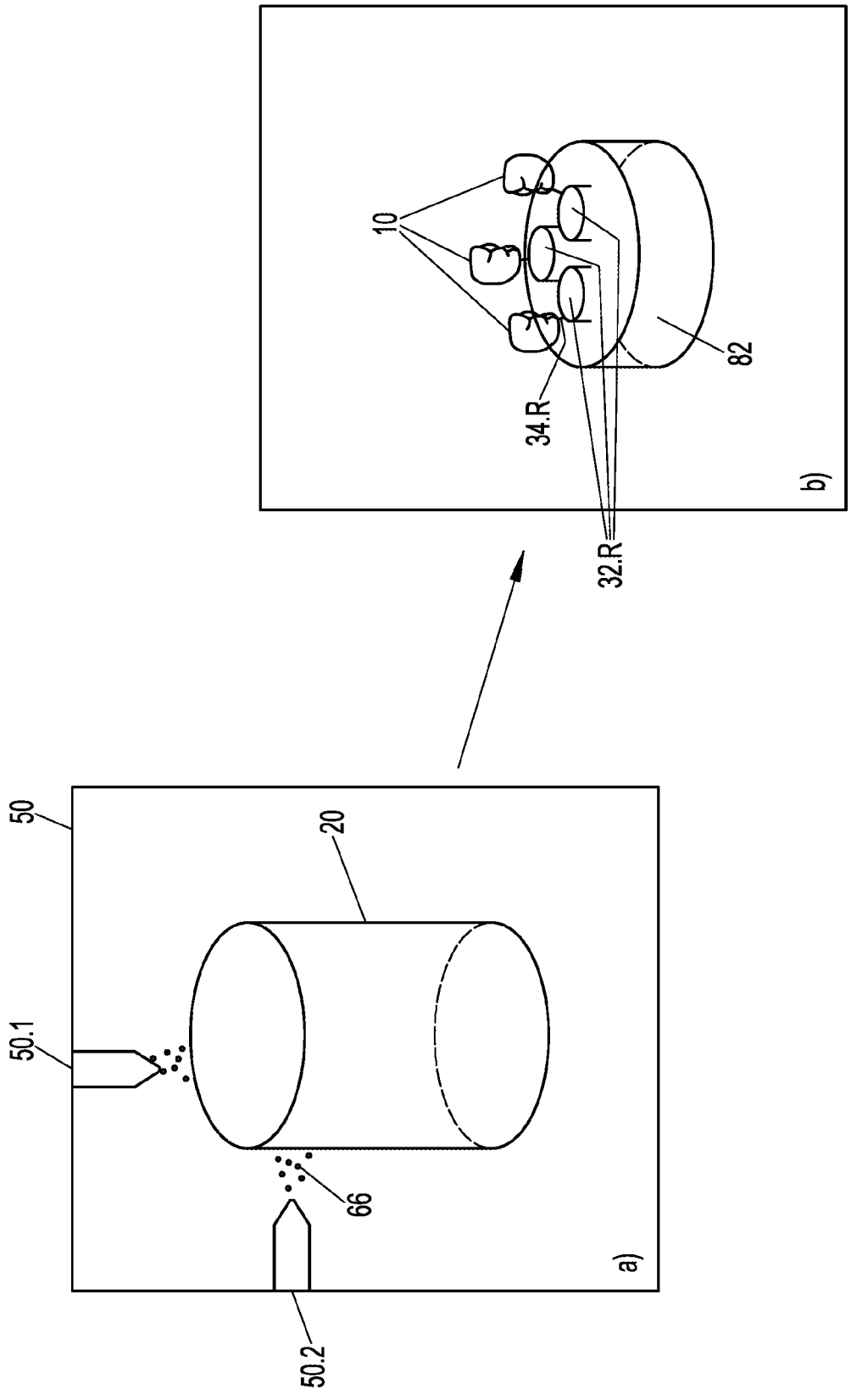
Figure 11:
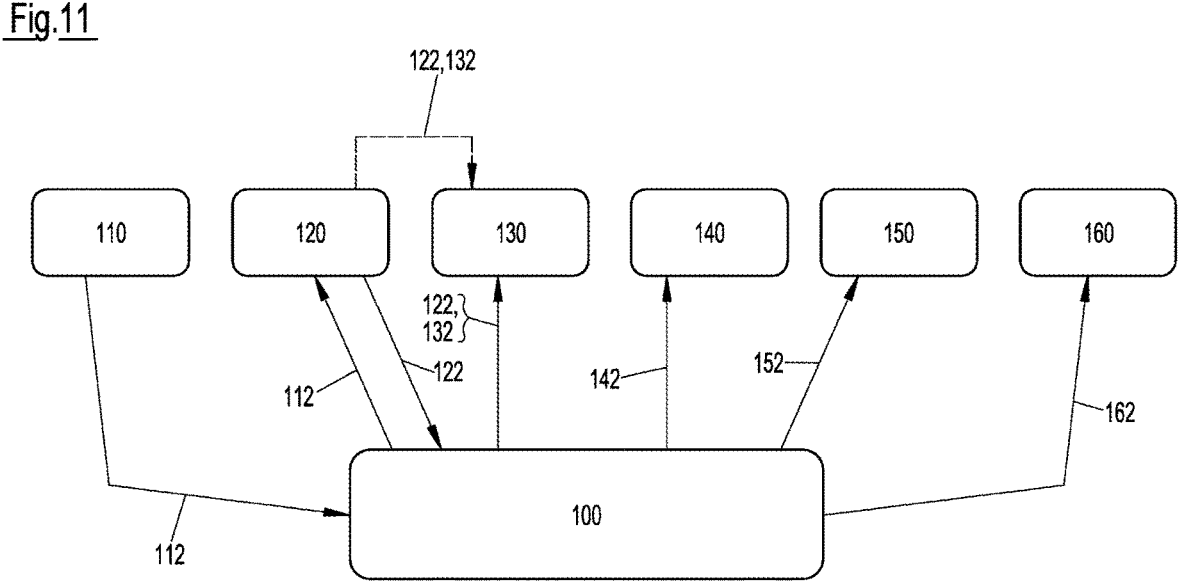

The method in accordance with the invention and the system in accordance with the invention will be described purely by way of example in the following with respect to an advantageous embodiment and to the Figures enclosed. There are shown:

FIG. 1 an intraoral scanning of a dentition of a patient;

FIG. 2 a preparation of a virtual model of a dental component adapted to the dentition of the patient with the aid of a computer-based program;

FIG. 3 a positioning of virtual base bodies with the aid of the program;

FIG. 4 a positioning of the virtual models on the virtual base bodies with the aid of the program;

FIG. 5 a production of a virtual structure on the basis of the virtual models with the aid of the program;

FIG. 6 a physical structure that was produced on the basis of the virtual structure;

FIG. 7 an embedding of the physical structure in an investment material to produce an embedded body;

FIG. 8 a burning out of the physical structure from the embedded body to produce a negative mold;

FIG. 9 an insertion of a raw material required for the production of the dental components and of pressing punches into the negative mold;

FIG. 10 a deflasking of the dental component with the aid of a deflasking device; and FIG. 11 an embodiment of the system in accordance with the invention.

FIGS. 1 to 10 show the individual steps of an embodiment of the method in accordance with the invention.

A first step of the method in accordance with the invention is shown schematically in FIG. 1. A part of a dentition 42 of a patient is scanned intraorally (indicated by the reference numeral 26) with the aid of a scanning apparatus 40. The part of the dentition 42 has the gums 56 of the dentition, two defect-free teeth 68, and a defective tooth 70 requiring a partial dental prosthesis. It is generally also conceivable that a (negative) impression of the dentition 42 is produced. This impression can then be scanned. However, it is also possible by means of the impression to produce a (positive) physical model of the dentition 42 that is then scanned.

The scan data form the basis for a virtual model 42.V of the scanned part of the dentition 42 (see FIG. 2).

FIGS. 2 to 5 show a graphical user interface 58 of a computer-based program for virtually processing the virtual model 42.V, wherein the graphical user interface 58 has a toolbar 60 by means of which different tools can be selected for preparing and processing a virtual model 14 of a dental component provided for the reconstruction of the defective tooth 70.

In FIG. 2, the virtual model 14 of this partial dental prosthesis is shown that is adapted to the previously prepared virtual dentition 42.V. The virtual dentition 42.V comprises virtual gums 56.V and a virtual, defective tooth 70.V. For example, the virtual dentition 42.V is based on the previously performed intraoral scan 26. With the aid of the computer-based program, the virtual model 14 can be adapted for the defective tooth 70 such that the dentition 42 of the patient can be repaired using a dental component 10 based on the virtual model 14. For example, the virtual model 14 can be automatically or manually taken from a database comprising a plurality of standard models. If necessary, the selected standard model can be adapted to the respective present situation to create a virtual model 14 that is optimized from the point of view of dental technology. In other words: The adaptation can take place automatically, semi-automatically (e.g. a manual adaptation of a basic model or of a standard model), or manually.

In principle, the preparation of a physical model of the virtual model 14 can now be started. However, a plurality of physical models are frequently produced at the same time for the simultaneous manufacture of a plurality of dental components for different patients in order to save costs.

For the embedding of the physical model still described in the following, it is advantageous if it is arranged on a kind of base or on a base body. This can also be planned with the aid of the program. The program can e.g. automatically determine how a plurality of physical models are spatially arranged as advantageously as possible to be able to simultaneously manufacture as many dental components as possible with one process run (this planning can also take place manually or with manual support). For this purpose, a plurality of base bodies are necessary under certain circumstances. In the present example, the program suggests an arrangement of three base bodies (virtual base bodies 30.V) (see FIG. 3). The arrangement of the base bodies 30.V can also be predefined by apparatus framework conditions, e.g. by a configuration of the furnace and/or by a design of a pressing apparatus of the furnace. The virtual base bodies 30.V can be connected to one another by virtual webs (not shown).

In the next step shown in FIG. 4, three virtual models 14 are arranged above the three virtual base bodies 30.V such that the virtual models are indeed disposed close to the virtual base bodies 30.V, but there are still no points of contact.

FIG. 5 represents a planning step in which virtual connection webs 34.V are inserted (automatically, manually, or partly manually) between the virtual base bodies 30.V and the virtual models 14. The connection webs 34.V connect the virtual base bodies 30.V to the virtual models 14. Thus, a virtual structure 72 was created by means of which a physical structure can be produced that forms the basis for preparing a suitable negative mold.

It is understood that the virtual production and processing of the structure 72 can generally take place automatically. However, there is preferably the possibility that an operator can make adjustments as required in all the planning steps.

FIG. 6 shows a physical structure 74 that was produced on the basis of the structure 72 virtually designed in FIGS. 2 to 5. The structure 74 has three physical models 16 that are each a physical copy of the corresponding virtual model 14 and that are each connected to a respective at least one base body 30 via at least one connection web 34. Connection webs can generally also be provided between the models 16 and the base bodies 30. They can subsequently be manually inserted or can already be taken into account in the virtual planning.

The structure 74 can be manufactured on the basis of the previously prepared virtual structure 72 by means of an additive manufacturing process, in particular by means of 3D printing. However, it is also possible to manufacture the structure 74 or individual parts thereof in a different manner—in particular by a stripping process, for example by means of milling—and/or to rework the structure 74, in particular manually.

On a production of the structure 74 by means of 3D printing, it is advantageous if all three basic components—models 16, base body 30, and connection webs 34—are produced from the same model material (e.g. a wax-like material and/or plastic). If the three components were only partly produced together or were even produced in individual steps using different methods, the three components thus preferably likewise have the same or at least a similar material. The materials used preferably have a similar melting behavior. The model material is in particular combustible without residue. The material preferably has a melting point, a boiling point, or a sublimation point in a range from above room temperature to 900° C.

A particularly suitable 3D printing process is, for example, stereolithography, in which a light-curing plastic is used.

The structure 74 produced is positioned in a well-defined position and alignment on a base plate 62 and is preferably fixed there. It can also be manufactured (e.g. printed) directly on the base plate 62.

As is shown in FIG. 7, a sleeve 64 is placed onto the base plate 62 so that it surrounds the structure 74 and is, for example, fastened to the plate 62 by means of a plug-in connection. The sleeve 64 forms a cup-like cylinder 78, which is open at one side, with the base plate 62. A suitable investment material 18 is now inserted into the inner space of the cylinder 78. The investment material 18 can be a gypsum-like material and/or phosphate-bonded and/or ethyl silicate-bonded.

After the curing of the investment material 18, the sleeve 64 and the base plate 62 are removed. This can in particular be promoted in that the inner sides of the sleeve 64 and of the base plate 62 are wetted with a separation means prior to the assembly and/or have a corresponding surface coating.

FIG. 8 shows a further step in the production of a dental component. The cured investment material 18 forms an embedded body 18A that is now inserted into a programmable burnout furnace 12A. The embedded body 18A is positioned such that the end face 84 of the cylindrical, cured investment material 18 formed by the base plate 62 faces downwardly.

The process parameters for operating the burnout furnace 12A can be selected automatically, manually, or partly manually on the basis of the virtual model 14, the virtual components 30.V, 34.V (see FIGS. 2 to 5), and/or the total virtual structure 72. The goal is to ensure that the models 16, the connection webs 34, and the base bodies 30 are removed as efficiently and completely as possible by a burning out of the cured investment material 18. For this purpose, suitable process parameters, such as a maximum temperature, a temperature development, and/or a firing duration, are selected to melt the material of the aforementioned components and/or to burn it off without residue without damaging the embedded body. The melted material or the combustion products of the material can flow out or escape from the body 18A.

The process parameters mentioned can naturally also be taken from a database or can be based on empirical values.

A negative mold 20 of the models 16, of the connection webs 34, and of the base bodies 30 results from the process of burning out the models 16, the connection webs 34, and the base bodies 30 from the embedded body 18A. The negative mold 20 thus has channels 32 that are negative impressions of the base bodies 30.

In FIG. 9, it is schematically shown how pellets 22 of a raw material are inserted into the channels 32 of the negative mold 20. Said raw material is preferably divided into portions such that it corresponds to the amount required for the respective dental component 10. The required amount can, for example, be determined from the virtual model 14. The raw material can also be introduced as powder, pellets, or in another form. It is melted in a dental furnace 12 and is pressed into the negative impressions of the models 16 via the negative impressions of the connection webs 34 (=connection passages) on the application of a pressing force to ensure a complete and pore-free filling of the impressions of the models 16. Connection passages between the models 16 and/or the channels 32 facilitate the exchange of melted raw material within different regions of the negative mold 20.

The pressing force is generated by a pressing device 48 associated with the furnace 12 and is transmitted to the raw material by means of pressing punches 80. The pressing force can be generated by an active movement of the punches 80 and/or by a movement of the negative mold 20 relative to the punches 80. The pressing force can be maintained constant or variable in time until the complete curing of the dental component produced. However, it is likewise possible that the pressing force is, for example, only applied until the raw material 22 has fully penetrated into the negative mold of the models 16.

A control device is associated with the dental furnace 12 by which said dental furnace 12 can be controlled. The dental furnace 12 is preferably freely programmable. The process parameters of a firing program—e.g. pressing force and temperature—are determined on the basis of the properties of the virtual model 16 and/or of the virtual structure 72. The type and/or the properties of the raw material used can in this respect be taken into account. It is e.g. possible for the operator to input this information manually and/or to obtain it from a database and to integrate it into the virtual model when planning the latter. The virtual model then therefore not only includes geometric information, but also information that characterizes the material. Based on, for example, the design of the dental components to be produced, the required amount of raw material 22 and the spatial position, the volume and/or the geometry of the negative impressions of the models 16 in the negative mold 20 (the number and position of the base bodies 30 can also be taken into account), a firing program can be automatically suggested by the control device, said firing program being defined by suitable process parameters that can also be a function of time if required. For example, the firing program is calculated or produced (in part) from suitable parameters of the present virtual models 16 or of the virtual structure 72. It is also possible that the firing program is (partly) taken from a program library, wherein parameters of the present virtual models 16 or of the virtual structure 72 are taken into account when selecting the suitable firing program. The suggested and/or produced firing program can be modified by an operator as required. A purely manual definition of the firing program is also conceivable in principle.

After the curing and cooling of the raw material in the negative mold 20, the investment material 18 is removed. This can take place manually. However, it is more efficient to at least partly automate the deflasking.

For this purpose, a deflasking device 50 is provided (see FIG. 10a) that removes the material 18 by means of compressed air blasting using a solid blasting means (see nozzles 50.1, 50.2) or by means of water blasting. Other stripping processes such as milling and/or combinations of different processes can also be used.

The position of the produced dental components in the mold 20 is known based on the data of the virtual structure 72 and due to the well-defined fixing of the physical structure 74 on the base plate 62. If the mold 20 is now positioned in a known alignment and position in the deflasking device 50, said data can serve as a basis for a control of the deflasking device 50. Said deflasking device 50 is controlled such that the material 18 is efficiently removed without damaging the components. An intervention by an operator nevertheless remains possible, should it be necessary. Provision can also be made that only a rough removal of the material 18 is performed in an automated matter and the final deflasking takes place manually. Larger regions of the body 18A in which no components are included can also be detached, in particular cut off, as whole pieces in a manual, semi-automated, or automated manner.

The type and/or the properties of the investment material 18 can be taken into account in the automated or semi-automated deflasking. For example, corresponding information is input manually or is taken from a database.

Markings and/or mechanical codings can be provided to facilitate the positionally accurate and reproducible positioning of the structure 74 on the base plate 62 (or on a comparable base unit) and/or of the mold 20 in the device 50.

FIG. 10b shows the result of the deflasking. The dental components 10 produced by means of the mold 20 are also connected to the raw material (webs 34.R) that is cured in the passages produced by the webs 34 and that is in turn connected to raw material cured in the channels 32 (see reference letter 32.R). The components 10, 34.R, and 32.R are an at least partial copy of the physical structure 74 (the base bodies 30 are generally not completely reproduced) that is anchored in a base 82 (remainder of the negative mold 20). The dental components 10 can now be detached and reworked as required.

FIG. 11 schematically shows a system in accordance with the invention. The raw data 112 acquired by a raw data acquisition device 110 (e.g. a scanner 40, see FIG. 1) are fed to a control 100 that can be a control and regulation device. It forwards the raw data 112 to a model planning module 120 that is, for example, a program module that is integrated into the control 100 or that runs on a separate processing unit.

A virtual model of the required dental component and/or of a structure including the component is—automatically, semi-automatically, or manually—generated on the basis of the raw data 112 with the aid of the model creation module 120 (see e.g. FIGS. 2 to 5). Corresponding model data 122 are transmitted via the control 100 or directly (see dashed arrow) to a model manufacturing device 130 (e.g. a 3D printer), where a physical model or a physical structure of the virtual model or of the virtual structure is produced (see e.g. FIG. 6). It is also possible that the model data 122 are first converted into operating parameters 132 and/or into a corresponding operating program for the device 130. The parameters or the program 132 can be input by an operator at the device 130 or at the control 100. However, the corresponding parameters or the corresponding program 132 are preferably automatically produced or selected on the basis of the model data 122 and—if necessary—modified by the operator as required.

After the embedding of the physical model or of the physical structure, the embedded body obtained is burned out in a programmable furnace 140 (e.g. a burnout furnace 12A, FIG. 8). The operating parameters 142 required for this purpose and/or a corresponding operating program can be input by an operator at the furnace 140 or at the control 100. However, the corresponding parameters or the corresponding program 142 are preferably automatically produced or selected on the basis of the model data 122 (wherein the type and/or the properties of the model material is/are preferably also taken into account) and—if necessary—modified by the operator as required.

The burnout process provides a negative mold of the physical model or physical structure. The mold is filled with the material of the dental component (see e.g. FIG. 9) and is fired in a programmable dental furnace (e.g. furnace 12)—optionally with a pressing device. The operating parameters 152 required for this purpose and/or a corresponding operating program can be input by an operator at the furnace 150 or at the control 100. However, the corresponding parameters or the corresponding program 162 are preferably automatically produced or selected on the basis of the model data 122 (wherein the type and/or the properties of the raw material is/are preferably also taken into account) and—if necessary—modified by the operator as required.

The component produced in the negative mold now has to be removed from the investment material. For this purpose, a deflasking apparatus 160 is provided (see e.g. the deflasking device 50, FIG. 10). The deflasking can generally take place manually. However, this step is preferably also performed in a completely automated manner or in an at least partly automated manner (e.g. "rough" deflasking in an automated manner, concluding "final deflasking" in a manual manner). The operating parameters 162 required for this purpose and/or a corresponding operating program can be input by an operator at the apparatus 160 or at the control 100. However, the corresponding parameters or the corresponding program 162 are preferably automatically produced or selected on the basis of the model data 122 (wherein the type and/or the properties of the raw material is/are preferably also taken into account) and—if necessary—modified by the operator as required.

A single control 100 was shown by way of example. However, it is also conceivable to provide two or more control units that each control and/or regulate parts of the process or one or more of the functional units 110, 120, 130, 140, 150, 160 described above. The control units can also be connected between a higher-ranking control and the functional units. The data exchange between the control or the control unit(s) and the functional units and/or among the control units themselves and/or among the functional units themselves (shown by way of example at the units 120, 130; if required, the other or some of the other units can also be connected to one another) preferably takes place via a network, e.g. via the Internet and/or via a local network (in a wireless and/or wired manner). Parts of the system can thus be arranged spatially separated from one another to make ideal use of resources.

Any necessary data format conversions or modifications of the data, e.g. a conversion of visualization data records into CAD data records or similar, can be performed at any desired point in the system. The same applies to the automatic or semi-automatic production and/or selection of the model parameters or model data or operating parameters or operating data 122, 132, 142, 152, 162.

The system in accordance with the invention or the corresponding method is based on a use of virtual data that is as efficient as possible to control different apparatus that are required to produce a dental component. Interventions by an operator are minimized, which is accompanied by cost advantages. The linking of the components of the system allows the spatial separation of individual process steps to be able to exploit specific location advantages in each case. For example, the planning of the dental component, that is the virtual preparation of the actual manufacturing steps, can take place at a different location than the actual manufacturing steps.

REFERENCE NUMERAL LIST

10 dental component
12 dental furnace
12A burnout furnace
14 virtual model
16 physical model
18 investment material
18A embedded body
20 negative mold
22 raw material pellet
26 intraoral scanning
30 physical base body
30.V virtual base body
32 channel
32.R cured raw material in the channel 32
34 physical connection web
34.R web composed of cured raw material
34.V virtual connection web
40 scanning apparatus
42 physical dentition
42.V virtual dentition
48 pressing device
50 deflasking device
50.1, 50.2 nozzle
56 physical gums
56.V virtual gums
58 graphical user interface
60 toolbar
62 base plate
64 sleeve
68 healthy tooth
70 damaged tooth
70.V virtual damaged tooth
72 virtual structure
74 physical structure
78 cylinder
80 pressing punch
82 base
110 raw data acquisition device
112 raw data
120 model planning module
122 model data
130 model manufacturing device
140, 150 programmable furnace
132, 142, 152, 162 operating parameters, operating program
160 deflasking apparatus

The invention claimed is:

1. A method of manufacturing a dental component, the method comprising the following steps:
   (i) producing a model of the dental component;
   (ii) embedding the model in an investment material;
   (iii) removing the model from the investment material to obtain a negative mold of the model;
   (iv) inserting a raw material for manufacturing the dental component into the negative mold;

(v) producing the dental component in the negative mold from the raw material; and
(vi) deflasking the dental component from the negative mold in an at least partly automated manner on the basis of a virtual model of the dental component, wherein data of the virtual model is used to determine a position of the dental component in the negative mold for the deflasking.

2. The method in accordance with claim 1, wherein the virtual model is based on at least one of a 3D scan of the model and a tomography of the negative mold; and/or wherein the virtual model is based on virtual data of a dentition of a patient or of a part thereof.

3. The method in accordance with claim 2, wherein the virtual data of a dentition of a patient or of a part thereof are generated on the basis of an intraoral scan and/or of a scan of a negative impression of a dentition of a patient or of a part thereof.

4. The method in accordance with claim 1, wherein a deflasking device for deflasking the dental component is provided and comprises a control unit that controls the deflasking device on the basis of the virtual model.

5. The method in accordance with claim 4, wherein the negative mold has at least one means for virtually defining a model coordinate system relative to a coordinate system of the deflasking device, by which the position and/or alignment of the dental component in the negative mold can be determined with respect to the deflasking device;
and/or wherein the negative mold and/or the deflasking device has/have at least one alignment means, by which an exact alignment of the negative mold in the deflasking device can be defined.

6. The method in accordance with claim 1, wherein a desired/actual comparison by means of the virtual model and data of a tomography of the negative mold is performed and the at least partly automated manner of the deflasking is adapted on the basis of the desired/actual comparison.

7. The method in accordance with claim 1, wherein the deflasking of the dental component in an at least partly automated manner is carried out by means of a stripping manufacturing process, the stripping manufacturing process comprising a compressed air blasting using a blasting means, a water blasting, or a milling.

8. The method in accordance with claim 1, wherein a removal rate or a speed of the deflasking is adjustable.

9. The method in accordance with claim 8, wherein the removal rate or the speed of the deflasking occurs at a lower removal rate or a lower speed in the vicinity of the dental component than at a greater distance from the dental component.

10. The method in accordance with claim 1, wherein the model of the dental component is manufactured by means of additive manufacturing.

11. The method in accordance with claim 1, wherein the model of the dental component is produced on the basis of the virtual model.

12. A system for manufacturing a dental component, the system comprising:
a deflasking device for an at least partly automated removal of the dental component from a negative mold formed by embedding a model of the dental component in an investment material; and
a control device, with the deflasking device being connectable or connected to the control device, and with the control device configured to provide control data to the deflasking device for deflasking the dental component from the negative mold on the basis of a virtual model of the dental component such that data of the virtual model is used to determine a position of the dental component in the negative mold for the deflasking.

13. The system in accordance with claim 12, wherein the system additionally comprises a programmable dental furnace, with the programmable dental furnace being connectable or connected to the control device.

14. The system in accordance with claim 12, wherein the system additionally comprises a raw data acquisition device for intraorally scanning a dentition of a patient or a part thereof, for scanning a negative impression of a dentition of a patient or a part thereof, and/or for scanning the model of the dental component.

15. The system in accordance with claim 12, wherein the control device is configured and adapted to receive the virtual model and/or to prepare the virtual model.

16. The system in accordance with claim 12, wherein the system additionally comprises a model manufacturing apparatus for additively manufacturing the model on the basis of the virtual model.

17. The system in accordance with claim 12, wherein the system additionally comprises a programmable furnace for removing the model from the investment material, with the furnace being connectable or connected to the control device to receive control data from the control device.

18. The system in accordance with claim 12, wherein the system additionally comprises a dental furnace having a pressing device by means of which a raw material for forming the dental component can be inserted into the negative mold on the application of a pressing force and/or by means of which the dental component can be produced or fired on the application of a pressing force.

19. The system in accordance with claim 12, wherein at least one of a raw data acquisition device used to generate the virtual model, a model manufacturing apparatus for manufacturing the model of the dental component, a programmable furnace for removing the model from the investment material, a dental furnace for forming the dental component, and the deflasking device has a control unit that is separate from the control device and that is connectable and/or connected to the control device.

* * * * *